No. 683,247. Patented Sept. 24, 1901.
G. Y. CARTER.
COMPOUND RULE ATTACHMENT.
(Application filed Mar. 30, 1901.)
(No Model.)

WITNESSES:
Henry King
Russell M. Everett

INVENTOR
George Y. Carter,
BY
Drake & Co.
ATTORNEYS.

THE NORRIS PETERS CO., PHOTO-LITHO., WASHINGTON, D. C.

UNITED STATES PATENT OFFICE.

GEORGE Y. CARTER, OF ARLINGTON, NEW JERSEY.

COMPOUND RULE ATTACHMENT.

SPECIFICATION forming part of Letters Patent No. 683,247, dated September 24, 1901.

Application filed March 30, 1901. Serial No. 53,595. (No model.)

*To all whom it may concern:*

Be it known that I, GEORGE Y. CARTER, a citizen of the United States, residing at Arlington, in the county of Hudson and State of New Jersey, have invented certain new and useful Improvements in Compound Rule Attachments; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide an attachment for measuring-sticks, and more particularly the rule commonly used by carpenters and other mechanics, which will enable the mechanic or person using the said rule to perform therewith various mechanical operations with greater convenience, facility, and ease, and to secure other advantages and results, some of which may be referred to hereinafter in connection with the description of the working parts.

The invention consists in the improved measuring-stick and appliances therefor and in the arrangements and combinations of parts of the same, all substantially as will be hereinafter set forth, and finally embraced in the clauses of the claim.

Figure 1:
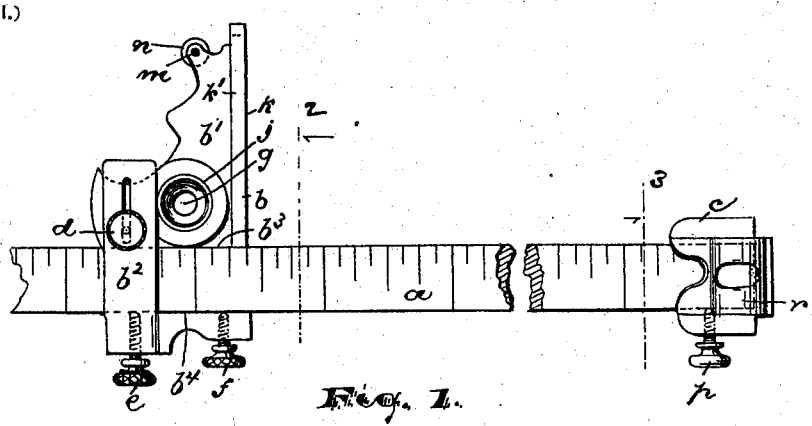
Figure 2:
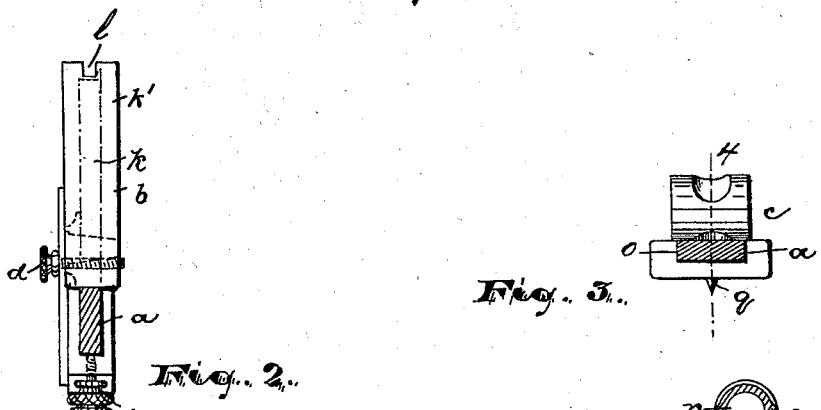
Figure 3:
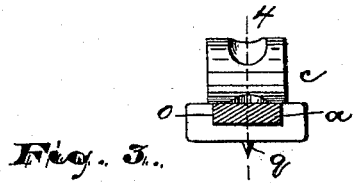
Figure 4:
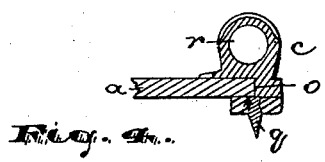
Figure 5:
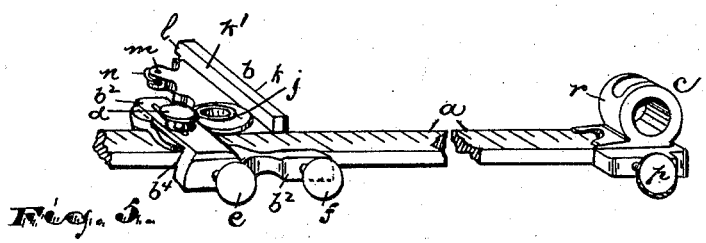

Referring to the accompanying drawings, in which like letters of reference indicate corresponding parts in each of the several views, Figure 1 is a plan of a portion of the rule having the improved appliances thereon. Fig. 2 is a section of the same taken at line 2, and Fig. 3 is a section taken at line 3, of Fig. 1. Fig. 4 is a section taken on line 3 of Fig. 3, and Fig. 5 is a perspective view of the device.

In said drawings, $a$ indicates a measuring stick or rule of any suitable construction, having marks expressing inches and fractions thereof or other standard measurements. $b$ is an adjustable block or head, which is preferably of metal, but which may be of other suitable material adapted to be clamped upon said rule or measuring-stick and to be adjusted thereon as hereinafter set forth, and $c$ is another block or footpiece adjustably attached to the rule at a distance from the first said block and adapted to coöperate with the first said block and the rule in the manner and to secure the results hereinafter described. The head or block $b$ is of irregular shape and provides a slideway $b^3$ $b^4$ for the rule adapted to permit the latter to be held rigidly in said slideway, so that there will be no looseness of movement of one part on the other when the rule is clamped in said slideway. I prefer to make the block $b$ in sections $b'$ $b^2$, the section $b'$ providing a straight bearing $b^3$, adapted to engage one edge of the rule or stick, and the section $b^2$ providing a second bearing $b^4$, adapted to engage the opposite edge of the rule or stick. The said sections $b'$ $b^2$ are adjustably secured together by a set-screw $d$, and thus the said block $b$ may be securely fastened upon rules or sticks of various widths. If the sections $b'$ $b^2$ are not rigidly clamped against the rule, the latter may slide in the slideway to permit the desired adjustments to be obtained. I may employ also screws $ef$ to serve in clamping the block $b$ with greater firmness to the measuring stick or rule when the block is adjusted to lie at the protruding knuckle or hinge joint commonly found upon rules, so that when it becomes necessary to fasten the block $b$ at said knuckle or joint the bearing $b^4$ may be set back or away from the edge of the rule and the screws $ef$ set against the said edge, so there will be a straddling of the parts and there will be no interference. The said block $b$ is transversely perforated, as at $g$, and the said perforation at the upper side of the block is surrounded by a funnel $j$, the said perforation permitting the passage of a pencil-point through the block and the funnel $j$ serving as a guide to direct the point into said perforation. Contiguous to said perforation the block $b$ is provided with a straight-edge $k$, which is preferably flanged, as at $k'$ in Fig. 5, the said straight-edge being formed at right angles to the line of the bearing $b^3$, so that said straight-edge will extend, when the part $b$ is attached to the rule or stick, at right angles to said rule or stick, as shown in Fig. 1, the said stick and straight-edge together serving as a square adapted to perform the usual functions of a carpenter's square. At the extremity of the straight-edge the flange $k'$ is extended beyond the body of the block and is notched or bifurcated, as shown in Fig. 2 at 1, the notch serving to receive and hold a piece of glass while breaking said glass after it has been cut by a diamond or other glass-cutting tool. At one side of the bifurcated flange $k'$ the body of the block $b$ is provided with pivotal bearings $m$ for a rotary glass-cutter $n$, by means of which the glass above referred to may be cut preliminary to breaking it by means of the forked flange. To coöperate with the block $b$ and rule $a$ when the same are to be employed in marking circles with a lead-pencil or the like, I employ the second block attachment $c$. This is provided with a socket $o$ to receive the end of the stick $a$ and the screw $p$, by means of which the block may be rigidly fastened upon said stick or rule. Said block $c$ is provided on the under side with a center pin $q$, adapted to be forced into a board or the like and serve as a center upon which the several parts above described may turn in marking off the curves, circles, or the like. The said block $c$ above the plane of the rule $a$ is also transversely perforated or provided with a cylindrical conformation $r$, extending parallel with the board side of the rule, through which a pencil may be thrust and held by the hand when marking a board to be cut with a saw in a line parallel with the edge of said board. The parts being adjusted upon the measuring stick or rule, the latter serving by means of its scale or measure-indicating marks to enable the proper radial distances to be easily determined, the operator simply thrusts his pencil through the perforation $j$ and turns the block $b$ about the center $q$, and thus forms the desired curves or circles, or the tool may be otherwise used, as above indicated.

Having thus described the invention, what I claim as new is—

1. The combination with the rule $a$ and separable center block, of a block $b$, separably fastened upon said rule and having a straight-edge $k$, formed at right angles to the bearing $b^3$, against which the said rule is fastened and having a pencil-opening $g$ and funnel, the said block being in sections, and adapted to be clamped upon rules of various widths, substantially as set forth.

2. The rule attachment herein described comprising the sections $b'$, $b^2$, adjustably connected and provided with a straight-edge $k$, and pencil-point perforation and screws $e, f$, all arranged and operating, substantially as set forth.

In testimony that I claim the foregoing I have hereunto set my hand this 15th day of March, 1901.

GEO. Y. CARTER.

Witnesses:
CHARLES H. PELL,
C. B. PITNEY.